(12) United States Patent
Wickham et al.

(10) Patent No.: US 6,301,421 B1
(45) Date of Patent: Oct. 9, 2001

(54) PHOTONIC CRYSTAL FIBER LASERS AND AMPLIFIERS FOR HIGH POWER

(75) Inventors: Michael G. Wickham, Rancho Palos Verdes; Gerald W. Holleman, Manhattan Beach; Stephen J. Brosnan, San Pedro, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/318,554

(22) Filed: May 27, 1999

(51) Int. Cl.[7] .................................................... H01S 3/067
(52) U.S. Cl. .............................. 385/126; 385/142; 372/6; 372/66; 372/70; 359/341
(58) Field of Search ................................. 385/123–127, 385/141, 142, 144, 146; 372/6, 69, 70, 66, 92; 359/341

(56) References Cited

U.S. PATENT DOCUMENTS

| 5,802,236 | * | 9/1998 | DiGiovanni et al. | 385/127 |
| 6,058,127 | * | 5/2000 | Joannopoulos et al. | 372/92 |
| 6,075,915 | * | 6/2000 | Koops et al. | 385/125 |
| 6,097,870 | * | 8/2000 | Ranka et al. | 385/127 |

OTHER PUBLICATIONS

Properties of Photonic Crystal Fiber and the Effective Index Model; Knight, Birks, and Russell; University of Bath, Bath, UK and University of Southampton, Southampton, UK; Optical Society of America; vol. 15, No. 3, Mar. 1998, pp. 748–752.

Endlessly Single–Mode Photonic Crystal Fiber; Birks, Knight, and Russell; University of Bath, Bath, UK and University of Southampton , Southampton, UK, Optical Society of America; vol. 22, No. 13, Jul. 1, 1997, pp. 961–963, *Optics Letters*.

\* cited by examiner

*Primary Examiner*—John D. Lee

(57) ABSTRACT

A photonic crystal fiber (10, 110) is provided for a laser/amplifier system including a guiding structure comprising a geometric array of axial passages (20, 120) formed along the length of the fiber (10, 110). More particularly, the guiding structure includes a central silica rod (14, 114) which is doped with a rare earth element for providing optical gain to the laser/amplifier. A plurality of second silica rods (16, 116) are disposed circumferentially about the central rod (14, 114). Each of the second rods (16, 116) includes an axial passage (20, 120) formed therethrough along the length of the fiber (10, 110). A reflective coating (22, 122) is deposited on an outboard surface of the array of rods (12, 112) to confine pumped light (30, 130) therein. The pumped light (30, 130) may be injected into the fiber (10, 110) from the side by focusing it through small holes (24) in the reflective coating (22) or by reflecting it off transverse Bragg gratings (56) written into a fiber pigtail (50) coupled to the fiber (110). The mode field diameter of the fiber (10, 110) is controlled by properly selecting the diameter and spacing of the passages (20, 120) in the second rods (16, 116).

12 Claims, 2 Drawing Sheets

PHOTONIC CRYSTAL FIBER LASERS AND AMPLIFIERS FOR HIGH POWER

BACKGROUND OF THE INVENTION

1. Technical Field

The present invention generally relates to laser and amplifier systems and, more particularly, to laser and amplifier systems employing fiber optics.

2. Discussion

Lasers and amplifiers employing fiber optics are known to be very efficient. However, such systems are currently limited to low-output powers since conventional single mode fibers can only tolerate very small mode field diameters. As such, any attempt to increase the power through the fiber causes high intensity at the fiber output facet. This results in catastrophic damage.

Further, if an appropriate fiber was developed for tolerating such increased power, a high level of pump power would be required. To maintain the efficiency intrinsic with a fiber geometry, the pumped radiation must propagate along the fiber axis. However, conventional multi-mode high power pumps are difficult to focus on the small cross-section at the end facet of a fiber.

In view of the foregoing, it would be desirable to provide an efficient laser/amplifier fiber system capable of providing large mode field diameters, as well as a mechanism to couple the required pump power to the fiber.

SUMMARY OF THE INVENTION

The above and other objects are provided by a photonic crystal fiber for a laser/amplifier system including a guiding structure comprising a regular geometric (e.g. hexagonal) array of axial passages formed along the length of the fiber. More particularly, the guiding structure includes a central silica rod which is doped with a rare earth element for providing optical gain to the laser/amplifier. A plurality of second silica rods are disposed circumferentially about the central rod. Each of the second rods includes an axial passage formed therethrough along the length of the fiber. The first and second rods are then drawn down to a pre-selected diameter. This process transforms the first and second rods into a sintered cluster in the form of a geometric array. A reflective coating is deposited on an outboard surface of the array to confine pumped light therein. The pumped light may be injected into the fiber from the side by focusing it through small holes in the reflective coating or by reflecting it off transverse Bragg gratings written into a fiber pigtail coupled to the fiber. The mode field diameter of the fiber is controlled by properly selecting the diameter and spacing of the passages in the second rods.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

The present invention is directed towards a photonic crystal fiber for use in a laser or amplifier system. The photonic crystal fiber of the present invention includes a rare earth element doped core which yields large mode field diameters. Further, the photonic crystal fiber of the present invention is efficiently coupled to a high power pump by way of openings in a reflective coating or transverse Bragg gratings written into a fiber pigtail so that high power output may be provided.

Figure 1:
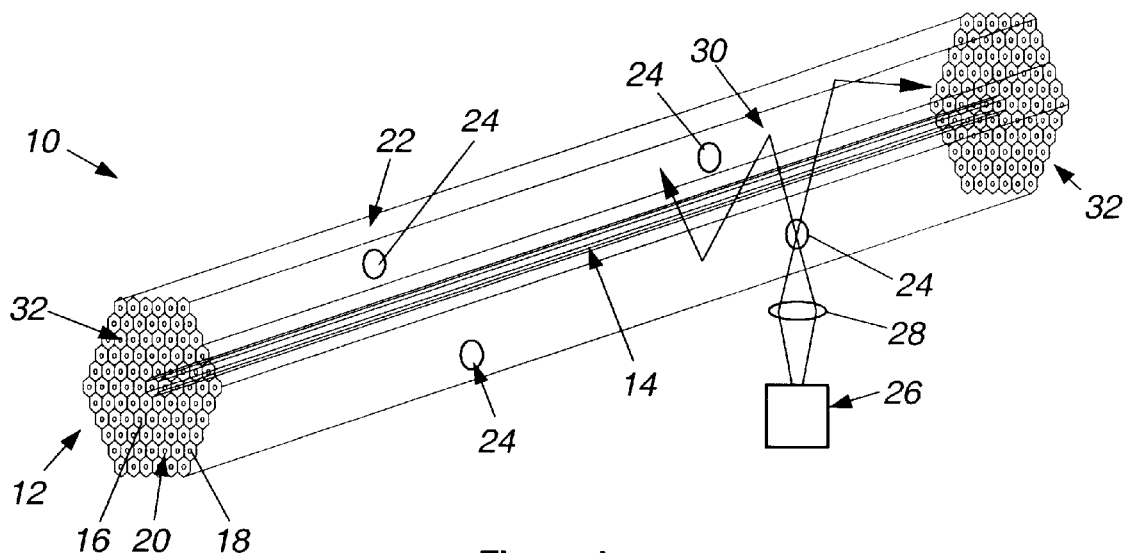
FIG. 1 is a schematic perspective view of a photonic crystal fiber laser/amplifier in accordance with a first embodiment of the present invention.

Turning now to the drawing figures, FIG. 1 illustrates a photonic crystal fiber according to a first embodiment of the present invention. The photonic crystal fiber 10 includes a plurality of members 12 aligned along a central axis of the photonic crystal fiber 10. The members 12 are preferably formed of a transparent, low-loss, damage resistant material such as silica. Further, the members 12 are preferably elongated rods having an initial cylindrical shape and macro-level size. However, after the members 12 are positioned adjacent one another they are heated until they start to melt so that they begin to sinter together. Thereafter, the cluster of sintered members 12 are subjected to repeated drawing processes to reduce the diameter of the cluster. This process continues the sintering of the members 12 so that the boundaries between individual members 12 are somewhat lost. Further, the drawing process causes the individual members 12 to form a hexagonal array, but different geometries such as triangular could be achieved by starting with a triangular cross section in the members 12.

Figure 2:
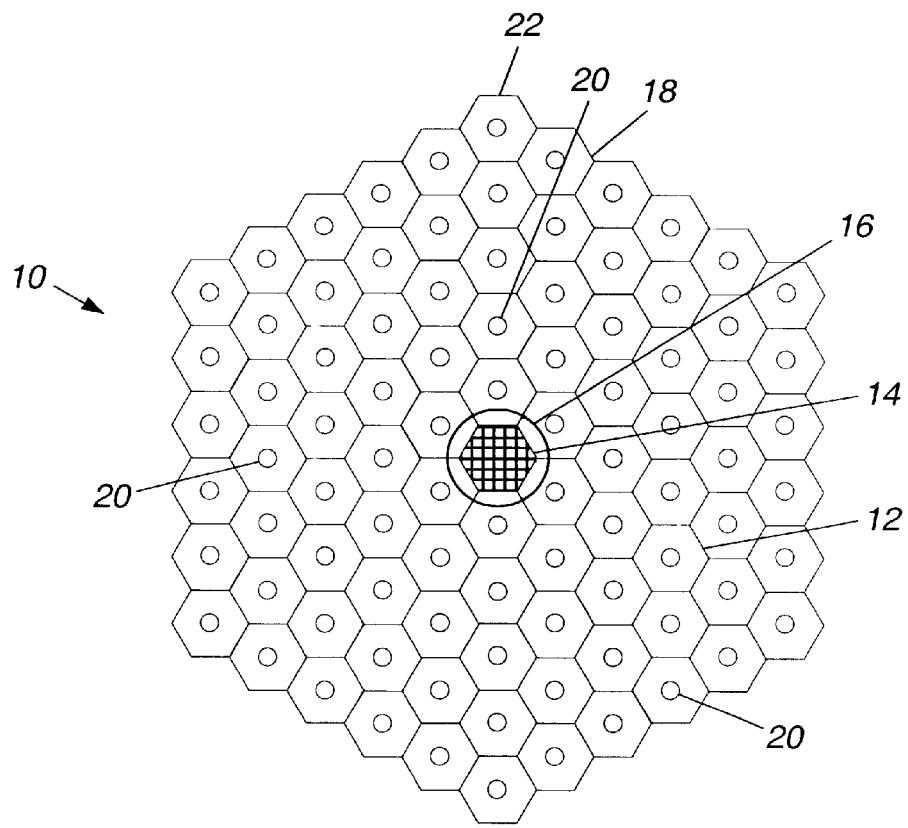
FIG. 2 is a cross-sectional schematic view of a photonic crystal fiber laser/amplifier according to the present invention.

Referring momentarily to FIG. 2, the members 12 include a first or central rod member 14 encircled by a plurality of second or body-forming rod members 16. The outermost layer of second rod members 16 is sometimes referred to hereinafter as third or perimeter rod members 18. The central rod member 14 is preferably doped with an optically pumpable material for providing an optical gain to the photonic crystal fiber 10. The optically pumpable material used for doping the central rod member 14 is preferably formed of a rare earth element. For example, erbium, neodymium, and ytterbium may be used. Also, the dopant preferably has a radial profile selected to enhance the stability of low order modes through the photonic crystal fiber 10.

The index of refraction of the second rod members 16 (including the perimeter rod members 18) should match the index of refraction of the doped central rod member 14. To accomplish this, it may be necessary to add an optically inactive material to the second rod members 16. For example, germanium may be used.

Each of the second rod members 16 includes an axial passage 20 formed therein along a longitudinal axis thereof and extending along the length of the photonic crystal fiber 10. The diameter of each passage 20 relative to the size of the second rod member it is formed through is pre-selected such that upon drawing, a desired mode field diameter of the photonic crystal fiber 10 is provided. The spacing between the axial passages 20 may also be manipulated to further control the mode field diameter.

Referring again to FIG. 1, a reflective coating 22 is deposited on the outboard surface of the photonic crystal fiber 10 to confine pump light therein. More particularly, the reflective coating 22 is deposited on the outboard surface of the perimeter rod members 18. Although the skilled artisan will appreciate that many reflective materials are available for use as the reflective coating 22, it is presently preferred to employ a metallic material such as silver or aluminum. Alternatively, the reflective coating 22 may be formed by encasing the fiber 10 in a sleeve of material having a different index of refraction than the members 12.

A plurality of openings 24 are formed in the reflective coating 22 for enabling light to be injected therethrough and into the interior of the photonic crystal fiber 10. To accomplish this, a number of diode pump light sources 26, only one of which is illustrated, are provided proximate the photonic crystal fiber 10. A lens 28 is interposed between the diode pump light source 26 and the photonic crystal fiber 10. The lens 28 focuses the multi-mode radiation 30 from the diode pump light source 26 through the adjacent opening 24. Thereafter, the radiation 30 is internally reflected within the photonic crystal fiber 10 by the reflective coating 22. The gain medium of the photonic crystal fiber 10, i.e., the core of the fiber 10 surrounded by the passages 20, is energized when the multi-mode radiation 30 randomly reflects off of the reflective coating 22 and traverses the doped central rod member 14. Thereafter, the central rod member 14 guides the desired mode along the length of the photonic crystal fiber 10.

When the fiber 10 is used as a laser, the mode is repeatedly reflected off of a coating 32 disposed on both ends of the fiber 10 that is highly reflective at the laser and pump wavelengths. After the mode gains sufficient power, it leaks through one of the reflective coatings 32 in a steady stream. To accomplish this, it is preferred to form one of the reflective coatings 32 with less than 100% reflectivity at the laser wavelength.

Alternatively, when the fiber 10 is employed as an amplifier, both ends of the fiber 10 are covered with a coating 32 which is anti-reflective at the amplifier wavelength. As such, the mode is allowed to propagate therethrough after a single pass. Although any number of coating materials may be used for either the highly reflective or anti-reflective coating 32, it is presently preferred to use a dielectric material.

Figure 3:
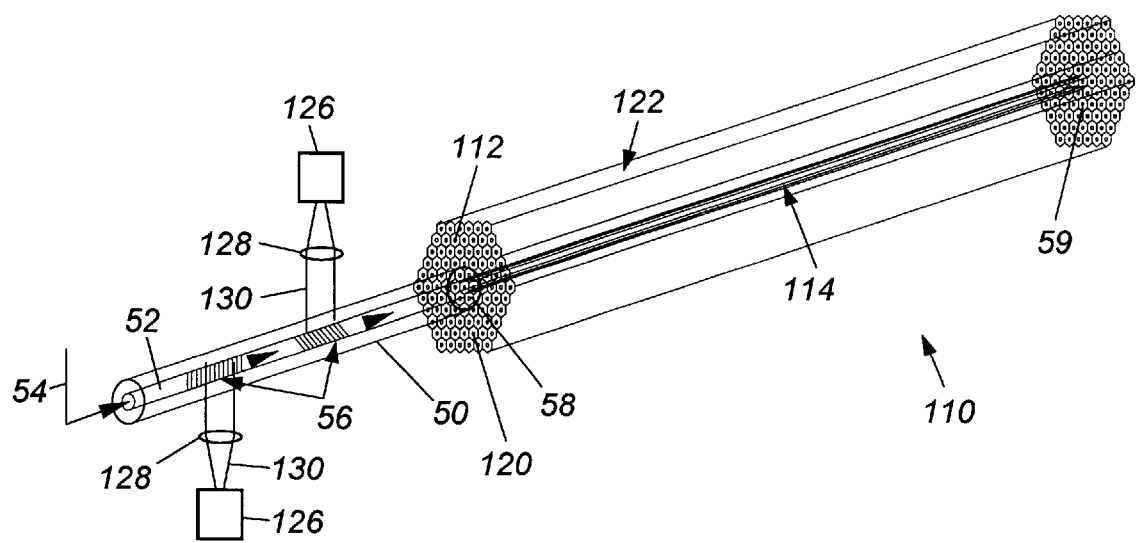
FIG. 3 is a schematic perspective view of a photonic crystal fiber laser/amplifier according to a second embodiment of the present invention.

Turning now to FIG. 3, a second embodiment of the photonic crystal fiber laser/amplifier of the present invention is illustrated. In this embodiment, the same reference numerals as used in the first embodiment are employed to identify similar elements in the second embodiment but being increased by 100. The photonic crystal fiber 110 is identical to the photonic crystal fiber 10 of the first embodiment with the exception that the openings 24 in the reflective coating are omitted. As such, a second power pump arrangement is employed for injecting radiation 130 into the interior thereof.

To accomplish the foregoing, a fiber pigtail 50 is coupled to the photonic crystal fiber 110. More particularly, the fiber pigtail 50 is coupled to the fiber 110 adjacent the central rod member 114. When the photonic crystal fiber 110 is employed as an amplifier, the pigtail 50 includes a core 52 wherein a signal 54 may be injected. Radiation 130 from the diode pump light sources 126 is focused by lenses 28 to impinge upon the Bragg gratings 56. The radiation 130 is reflected therefrom to the gain medium, i.e., the central rod member 114, of the photonic crystal fiber 110.

When the photonic crystal fiber 110 is employed as a laser, dielectric coatings 58 and 59 are deposited at the ends of the photonic crystal fiber 110. The dielectric coating 58 is highly reflective at the laser wavelength and minimally reflective at the pump wavelength. The dielectric coating 59 is optimally reflective at the laser wavelength and highly reflective at the pump wavelength. On the other hand, when the photonic crystal fiber 110 is employed as an amplifier, the dielectric coating 58 is not present and dielectric coating 59 is anti-reflective at the amplifier wavelength. In either case, the central rod member 114 guides the desired mode along the length of the photonic crystal fiber 110 until it is exited therefrom as described above.

The precise periodic nature of the photonic crystal fiber of the present invention enables a single mode fiber to be produced with large mode field diameters. The large mode field diameters permit the output power of the fiber to be substantially increased. Since the photonic crystal fiber of the present invention can be side pumped, the pump power can be distributed over a large area. Further, the reflective surface of the photonic crystal fiber confines the pump power therein so that it can be efficiently absorbed by the doped core. Although the photonic crystal fiber of the present invention will find usefulness in a myriad of applications, it is particularly well suited for systems that require high power, defraction-limited lasers in compact configurations that are insensitive to misalignment.

Those skilled in the art can now appreciate from the foregoing description that the broad teachings of the present invention can be implemented in a variety of forms. For example, the fiber may be made more rugged by applying a cladding or buffer layer of soft polymer to the outside of the reflective surface. Therefore, while this invention has been described in connection with particular examples thereof, the true scope of the invention should not be so limited since other modifications will become apparent to the skilled practitioner upon a study of the drawings, specification, and following claims.

What is claimed is:

1. An optical fiber for a laser/amplifier system comprising:

a first member doped with an optically pumpable material for providing an optical gain to said laser/amplifier system;

a plurality of second members circumferentially disposed about said first member, each of said second members including an axial passage formed therethrough; and a reflective coating deposited on a perimeter of said second members;

wherein said reflective coating includes at least one opening formed therein for receiving radiation therethrough.

2. The optical fiber of claim 1 wherein said optically pumpable material further comprises a rare earth element.

3. The optical fiber of claim 2 wherein said rare earth element is selected from a group including erbium, neodymium and ytterbium.

4. The optical fiber of claim 1 wherein an index of refraction of said second members matches an index of refraction of said first member.

5. The optical fiber of claim 4 wherein said index of refraction of said second members is controlled by adding an optically inactive material thereto.

6. The optical fiber of claim 1 wherein said first and second members further comprise silica.

7. A photonic crystal fiber comprising:
an array of rods including a central rod surrounded by a plurality of second rods terminating in a perimeter of third rods;
said central rod being doped with an a rare earth element for providing an optical gain;
each of said second and third rods including a hole formed therein along a longitudinal axis thereof; and
a reflective coating deposited on an outboard surface of said third rods;
wherein said reflective coating includes a plurality of openings therein for receiving radiation therethrough.

8. The photonic crystal fiber of claim 7 further comprising a second reflective coating deposited on both distal ends of said array.

9. The photonic crystal fiber of claim 7 wherein said rare earth element is selected from a group including erbium, neodymium and ytterbium.

10. The photonic crystal fiber of claim 7 wherein an index of refraction of said second and third rods matches an index of refraction of said central rod.

11. The photonic crystal fiber of claim 7 wherein said rods further comprise silica.

12. A method of forming a photonic crystal fiber for a laser/amplifier system comprising the steps of:
providing a first member;
doping said first member with a rare earth element;
coupling a plurality of second members about said first member so as to form an array, each of said second members including an axial passage formed therethrough along a longitudinal axis thereof;
depositing a reflective coating on an outboard surface of said array; and
forming at least one opening in said reflective coating for receiving radiation therethrough.

* * * * *